US011196751B2

(12) United States Patent
Gupta et al.

(10) Patent No.: US 11,196,751 B2
(45) Date of Patent: Dec. 7, 2021

(54) SYSTEM AND METHOD FOR CONTROLLING SECURITY ACCESS

(71) Applicant: Accenture Global Solutions Limited, Dublin (IE)

(72) Inventors: Prashant Gupta, Pune (IN); Abhishek Jain, Pune (IN); Jagadish Berigai Rama Iyengar, Bangalore (IN); Murali Krishna Vedagiri Venkata Naga, Bangalore (IN); Ramesh Naidu Thanniru, Hyderabad (IN); Gurram Venkata Ramana, Bangalore (IN); Nikhil G. Kumar, Greater Noida (IN); Balaji Nagarajan, Mumbai (IN); Ravishankar Krishnan, Bangalore (IN); Tushar Shinde, London (GB); Dayapatra Nevatia, Bangalore (IN); Vikas Pujari, Pune (IN); Shantanu Biswas, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 237 days.

(21) Appl. No.: 16/587,711

(22) Filed: Sep. 30, 2019

(65) Prior Publication Data

US 2021/0029129 A1 Jan. 28, 2021

(30) Foreign Application Priority Data

Jul. 22, 2019 (IN) ............................ 201941029496

(51) Int. Cl.

*H04L 29/06* (2006.01)
*G06N 20/00* (2019.01)

(Continued)

(52) U.S. Cl.

CPC .......... *H04L 63/102* (2013.01); *G06F 16/284* (2019.01); *G06N 5/04* (2013.01); *G06N 20/00* (2019.01); *H04L 63/08* (2013.01)

(58) Field of Classification Search

None

See application file for complete search history.

(56) References Cited

U.S. PATENT DOCUMENTS 10,523,682 B1 * 12/2019 Badawy .................. H04L 41/16
10,938,828 B1 * 3/2021 Badawy .................. H04L 63/20
2018/0007053 A1 * 1/2018 Grant .................... H04L 63/101

* cited by examiner

*Primary Examiner* — Cai Y Chen

(74) *Attorney, Agent, or Firm* — Plumsea Law Group, LLC

(57) ABSTRACT

The disclosed system and method provide a way to easily review, audit, and modify multiple users' security access authority. The disclosed system and method may include using a trained bot that is trained using a machine learning algorithm to retrieve user profile information from a complex network of tables stored in a relational database and to analyze the user profile information to generate a recommendation to revoke or approve at least one user's security access authority for at least one transaction type. In some embodiments, the disclosed system and method allow for a human expert to revoke or approve at least one user's security access authority for at least one transaction type based on the recommendation. In some embodiments, the disclosed system and method determine whether to revoke or approve at least one user's security access authority for at least one transaction type and may also revoke or approve the at least one user's security access authority based on the decision.

20 Claims, 10 Drawing Sheets

100
OBTAIN INPUT — 102
USE INPUT TO EXTRACT FIELD VALUES IN MULTIPLE TABLES IN A RELATIONAL DATABASE — 104
ANALYZE ONE OR MORE OF THE EXTRACTED FIELD VALUES TO MAKE A RECOMMENDATION TO REVOKE OR APPROVE AT LEAST ONE USER'S SECURITY ACCESS AUTHORITY — 106
DISPLAY THE RECOMMENDATION WITH ONE OR MORE OF THE EXTRACTED FIELD VALUES TO A HUMAN EXPERT AND PROVIDE THE HUMAN EXPERT WITH A WAY TO ACCEPT OR DECLINE THE RECOMMENDATION — 108
DID THE HUMAN EXPERT ACCEPT THE RECOMMENDATION? — 110
NO → TAKE NO ACTION — 112
YES → REVOKE OR APPROVE THE AT LEAST ONE USER'S SECURITY ACCESS AUTHORITY BASED UPON THE RECOMMENDATION — 114

(51) Int. Cl.
*G06N 5/04* (2006.01)
*G06F 16/28* (2019.01)

400

> PLEASE PROVIDE INPUT CRITERIA

USERS IN S7H SYSTEM

DOWNLOAD ALL RECORDS

| USER GROUP | TOTAL USERS | USERS WITH CRITICAL ACCESS | USERS TO ANALYZE |
|---|---|---|---|
| FINANCE | 12 | 9 | 9 |
| FIN | 1 | 1 | 1 |

MON OCT 22 2018 16:20:34 GMT+0530 (INDIA STANDARD TIME)

410

| SUMMARY OF ACTIONED RECORDS FOR FINANCE | | | |
|---|---|---|---|
| TOTAL RECORDS | APPROVED RECORDS | REVOKED RECORDS | RECORDS TO ANALYZE |
| 202 | 0 | 0 | 202 |

500

USERS WITH CRITICAL ACCESS IN FIN GROUP ⤓ DOWNLOAD

| SAP ID | USER NAME | USER ROLE | T-CODE | OBJECT | ACCESS | ACTION | COMMENTS | TIME STAMP WITH USER DETAILS |
|---|---|---|---|---|---|---|---|---|
| RKAMBLE | RKAMBLE | Z:AAES_ ALL_GENE RAL_USER | /IWBEP/SB | /IWBEP/SB | CHANGE | APPROVE | APPROVED | TUE OCT 16 2018 17:25:00 GMT+0530 (INDIA STANDARD TIME) LOGGED BY DEVELOPER |
| RKAMBLE | RKAMBLE | Z:AAES_ ALL_GENE RAL_USER | /IWBEP/SB | S_TRANSPRT | CHANGE | REVOKE | TEST REVOKE | TUE OCT 16 2018 17:25:37 GMT+0530 (INDIA STANDARD TIME) LOGGED BY DEVELOPER |
| RKAMBLE | RKAMBLE | Z:AAES_ ALL_DEV_ CRECHG | AL11 | S_DATASET | DELETE | | | |
| RKAMBLE | RKAMBLE | Z:AAES_ ALL_DEV_ DISPLAY | AL11 | S_DATASET | DELETE | | | |

| OBJECT | TCODE | ACCESS | RISK | ACTION |
| --- | --- | --- | --- | --- |
| S_USER_GRP | SU01 | CHANGE | L2 | APPROVE |
| S_USER_AGR | SU01 | CHANGE | L2 | REVOKE |
| S_USER_GRP | PFCG | DELETE | L3 | REVOKE |
| S_USER_PRO | SU01 | DELETE | L3 | REVOKE |
| S_USER_GRP | SU01 | DELETE | L3 | REVOKE |
| S_USER_GRP | PFCG | ADD OR CREATE | L3 | APPROVE |
| S_USER_AGR | SU01 | ADD OR CREATE | L3 | APPROVE |
| S_USER_AGR | SU01 | DELETE | L3 | REVOKE |
| S_USER_PRO | SU01 | ADD OR CREATE | L3 | APPROVE |
| S_USER_GRP | SU01 | ADD OR CREATE | L3 | APPROVE |
| S_TRANSPRT | SE01 | LOCK | L1 | APPROVE |
| S_DATASET | SE01 | DELETE | L3 | REVOKE |

FIG. 9

SYSTEM AND METHOD FOR CONTROLLING SECURITY ACCESS

CROSS-REFERENCE TO RELATED APPLICATIONS

This application claims the benefit of India Provisional Patent Application Number 201941029496, filed Jul. 22, 2019, and titled "System and Method for Controlling Security Access," which is incorporated by reference herein in its entirety.

TECHNICAL FIELD

The present disclosure generally relates to controlling security access. More specifically, the present disclosure generally relates to reviewing security access authority of individual users and making recommendations for revocation or approval of the security access authority of such individual users. The present disclosure also generally relates to reviewing security access authority of individual users, determining whether to revoke or approve the security access authority of such individual users, and revoking or approving the security access authority of such individual users.

BACKGROUND

Enterprise systems span across large enterprises for use by multiple users. Examples of enterprises include but are not limited to companies, corporations, organizations, and any other entities that are organized with multiple users. Examples of users in enterprises include but are not limited to employees, consultants, system administrators, and any other personnel authorized to access the enterprise application.

Enterprise systems often have a complex landscape with critical data having several levels of access across a variety of many users (e.g., employees, consultants, system administrators, etc.). To monitor these access levels regularly and ensuring the valid access are assigned to each users in addition to this also needs to ensure that IT partners do not have any create/change/delete access.

Periodic review of critical access in line with information technology general controls regulations at transaction level is a challenge. During information technology service transition from an incumbent service provider to a new service provider the inherited security access can only be reviewed and audited manually, which is time-consuming, slow, and prone to errors due to the complexity of the systems defining the security access. Errors in critical access can lead to unintentional changes resulting in high priority issue/business losses. Because it is difficult to efficiently and thoroughly review critical access, persistent out-of-date access allocations are very common in antiquated systems.

There is a need in the art for a system and method for controlling security access that addresses the shortcomings discussed above.

SUMMARY

The disclosed system and method provide a way to easily review, audit, and modify multiple users' security access authority. In some embodiments, the disclosed system and method may include using a trained bot that is trained using a machine learning algorithm to retrieve user profile information from a complex network of tables stored in a relational database and to analyze the user profile information to generate a recommendation to revoke or approve at least one user's security access authority for at least one transaction type. In some embodiments, the disclosed system and method may include using a trained bot that is trained using a machine learning algorithm to retrieve user profile information from a complex network of tables stored in a relational database, to analyze the user profile information to determine whether to revoke or approve at least one user's security access authority for at least one transaction type, and to revoke or approve at least one user's security access authority for at least one transaction type.

By using a trained bot that is trained using a machine learning algorithm to: (1) use one or more of a user identification, user list, user group, configuration file, and historical data to find a first field value of a first field in a first table stored in a relational database and (2) use the first field value to find a second field value of a second field in a second table stored in the relational database, the disclosed system and method more thoroughly, accurately, and efficiently gather user profile information from multiple tables in the relational database.

By using the trained bot to use one or more of the user identification, user list, user group, configuration file, historical data, first field, and second field to either: (1) generate a recommendation to revoke or approve at least one user's security access authority or (2) determine whether to revoke or approve the at least one user's security access authority, the disclosed system and method is able to make more consistent recommendations than a human, as humans are not always able to recognize how they are weighing factors in their decision making process. Machine learning can better recognize how the factors are weighed and apply these weights to variables in decision making. Also, machine learning can use millions of records of past decisions to help make future decisions within seconds. Machine learning can even use a human expert's responses (historical or in real time) to decisions made by machine learning to update and improve the weighing process used in a machine learning algorithm in real time. A practical application of the disclosed system and method is to (1) use machine learning to more thoroughly, accurately, and efficiently gather user profile information from multiple tables in the relational database, (2) use machine learning to generate a recommendation for a human expert to revoke or approve at least one user's security access authority, and (3) provide a simple way for the human expert to actually revoke or approve at least one user's security access authority by selecting to follow the recommendation. Another practical application of the disclosed system and method is to (1) use machine learning to more thoroughly, accurately, and efficiently gather user profile information from multiple tables in the relational database, (2) use machine learning to decide whether to revoke or approve at least one user's security access authority, and (3) use machine learning to automatically revoke or approve at least one user's security access authority based on the decision.

In one aspect, the disclosure provides a computer implemented method of controlling security access. The method may include obtaining input including one or more of a user identification, user list, user group, configuration file, and historical data. The method may include using a trained bot that is trained using a machine learning algorithm to use the one or more of a user identification, user list, user group, configuration file, and historical data to find a first field value of a first field in a first table stored in a relational database, wherein the first table contains one or more of the user identification, user list, user group, configuration file, and historical data. The method may include using the trained bot to use the first field value to find a second field value of a second field in a second table stored in the relational database, wherein the second table contains at least the first field value. The method may include using the trained bot to use one or more of the user identification, user list, user group, configuration file, historical data, first field, second field, and a third field to generate a recommendation to revoke or approve at least one user's security access authority.

In yet another aspect, the disclosure provides a non-transitory computer-readable medium storing software that may comprise instructions executable by one or more computers which, upon such execution, cause the one or more computers to: (1) obtain input including one or more of a user identification, user list, user group, configuration file, and historical data; (2) use a trained bot that is trained using a machine learning algorithm to use the one or more of a user identification, user list, user group, configuration file, and historical data to find a first field value of a first field in a first table stored in a relational database, wherein the first table contains one or more of the user identification, user list, user group, configuration file, and historical data; (3) use the trained bot to use the first field value to find a second field value of a second field in a second table stored in the relational database, wherein the second table contains at least the first field value; and (4) use the trained bot to use one or more of the user identification, user list, user group, configuration file, historical data, first field, second field, and a third field to generate a recommendation to revoke or approve at least one user's security access authority.

In yet another aspect, the disclosure provides a system for controlling security access, which comprises one or more computers and one or more storage devices storing instructions that may be operable, when executed by the one or more computers, to cause the one or more computers to: (1) obtain input including one or more of a user identification, user list, user group, configuration file, and historical data; (2) use a trained bot that is trained using a machine learning algorithm to use the one or more of a user identification, user list, user group, configuration file, and historical data to find a first field value of a first field in a first table stored in a relational database, wherein the first table contains one or more of the user identification, user list, user group, configuration file, and historical data; (3) use the trained bot to use the first field value to find a second field value of a second field in a second table stored in the relational database, wherein the second table contains at least the first field value; and (4) use the trained bot to use one or more of the user identification, user list, user group, configuration file, historical data, first field, second field, and a third field to generate a recommendation to revoke or approve at least one user's security access authority.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 shows a schematic diagram of a user access status display according to an embodiment;

FIG. 9 shows a schematic diagram of a data set according to an embodiment.

DESCRIPTION OF EMBODIMENTS

The disclosed system and method provide a way to easily review, audit, and modify multiple users' security access authority in an enterprise resource planning (ERP) platform. The disclosed system and method may include retrieving user profile information from a complex network of tables stored in a relational database of the ERP platform and analyzing the user profile information to either: (1) generate a recommendation to revoke or approve at least one user's security access authority for at least one transaction type or (2) decide to revoke or approve at least one user's security access authority for at least one transaction type. In some embodiments, the disclosed system and method may include further revoking or approving the at least one user's security access authority in the ERP platform in response to a human expert (such as a member of an auditing team) accepting the recommendation. In some embodiments, the disclosed system and method may include further revoking or approving the at least one user's security access authority in the ERP platform in response to a machine learning made decision to revoke or approve at least one user's security access authority for at least one transaction type.

Figure 1:
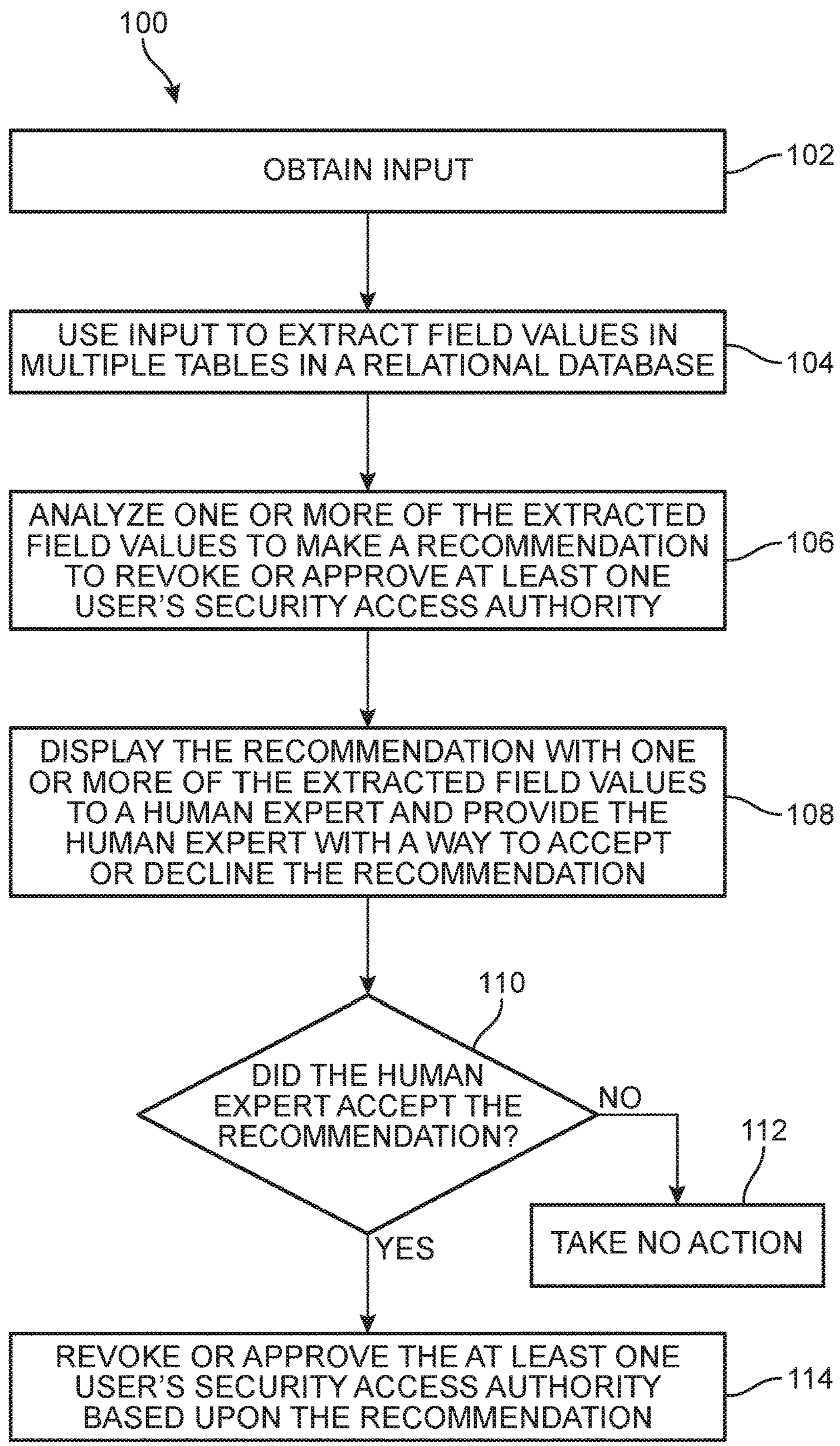
FIG. 1 shows method of controlling security access according to an embodiment.

FIG. 1 shows a method of controlling security access 100 (method 100), according to an embodiment. In some embodiments, retrieving user profile information from a complex network of tables stored in a relational database may be performed through a sequence of operations. These operations may generally include obtaining an input and using the input to extract field values in multiple tables stored in a relational database. For example, method 100 includes obtaining input (operation 102) and using the input to extract field values in multiple tables stored in a relational database (operation 104). In some embodiments, the input may include one or more of a user identification, user list, user group, configuration file, and historical data. For example, in some embodiments, a configuration file and either a user list or user group is used to extract field values in multiple tables stored in a relational database.

As described in more detail below with respect to FIG. 3, using the input to extract field values in multiple tables stored in a relational database may include several sub-operations. In some embodiments, a trained bot that is trained using a machine learning algorithm may be used to retrieve user profile information from a complex network of tables stored in a relational database. For example, a trained bot may be used to perform the sub-operations discussed with respect to FIG. 3.

Method 100 further includes analyzing one or more of the extracted field values to generate a recommendation to revoke or approve at least one user's security access authority (operation 106). In some embodiments, a trained bot that is trained using a machine learning algorithm may be used to analyze one or more of the extracted field values to generate a recommendation to revoke or approve at least one user's security access authority. In some embodiments, the bot performs all of the disclosed method of controlling security access. Method 100 includes displaying the recommendation with one or more of the extracted field values to a human expert and providing the human expert with a way to accept or decline the recommendation (operation 108). Method 100 includes determining whether a human expert accepts the recommendation (operation 110). Method 100 includes taking no action (operation 112) if the human expert does not accept the recommendation. Method 100 includes revoking or approving the at least one user's security access authority based on the recommendation (operation 114) if the human expert accepts the recommendation.

In many relational databases (e.g., databases in ERP), the information related to a user's security access authority may be scattered amongst multiple tables, and these tables may not be directly related. For example, a relational database may not include a table directly linking a user's name to the user's security access authority. Accordingly, finding a user's security access authority is not as simple as looking to a single table for a user's security access authority. Furthermore, the situation may be made more complicated by a user being a member of multiple groups and/or having multiple roles that affect the type of security access authority the user has for various types of transactions. Further still, a user's roles may be inherited, which also obscures a user's profile information in the relational database.

As mentioned before a user's name and security access authority may not be directly connected in a single table. For example, a first table may include a user's name and a role the user has. However, the first table may not include any information about the user's security access authority. In this example, a second table may link the role the user has to the role's corresponding security access authority. Thus, it is possible to use the user's name to look up the user's role in the first table and then use the user's role to find the security access authority corresponding to the user's role in the second table. This example is simpler than other situations. For example, as discussed below with reference to FIG. 3, more than two tables may be queried in some cases.

The disclosed system and method may include using a trained bot that is trained using a machine learning algorithm to use a combination logic to extract a user's information from multiple tables. In some embodiments, some or all of this extracted information may be information that can be analyzed to determine whether a user's security access authority should be modified or not. In some embodiments, this extracted information may be useful in finding other information that can be analyzed to determine whether a user's security access authority should be modified or not. In some embodiments, the trained bot may be used to analyze some or all of the extracted information to generate a recommendation as to whether to approve or revoke the user's security access authority. For example, in some embodiments, the trained bot may generate a recommendation as to whether to approve or revoke the user's security access authority for particular transaction types. In some embodiments, the trained bot may be used to analyze some or all of the extracted information to determine to whether to approve or revoke the user's security access authority. For example, in some embodiments, the trained bot may determine to whether to approve or revoke the user's security access authority for particular transaction types.

As discussed in further detail below, in some embodiments, the system and method may require a user to have valid license from the provider of the disclosed system to have access. Additionally, in some embodiments, the system may require the user to have valid credentials for client virtual private network (VPN) and the enterprise resource planning system in which the disclosed system accesses a relational database. These safeguards ensure that a user has the proper authority to enter into the system and make modifications to users' security access authority rights. In some embodiments, as discussed in more detail below, a bot may be used to perform operations of the method. Since some embodiments require multiple levels of security (e.g., the licenses and credentials discussed above) to access the relational database of interest, these embodiments of the disclosed system and method may require a human expert to log in for the bot to gain access.

Figure 2:
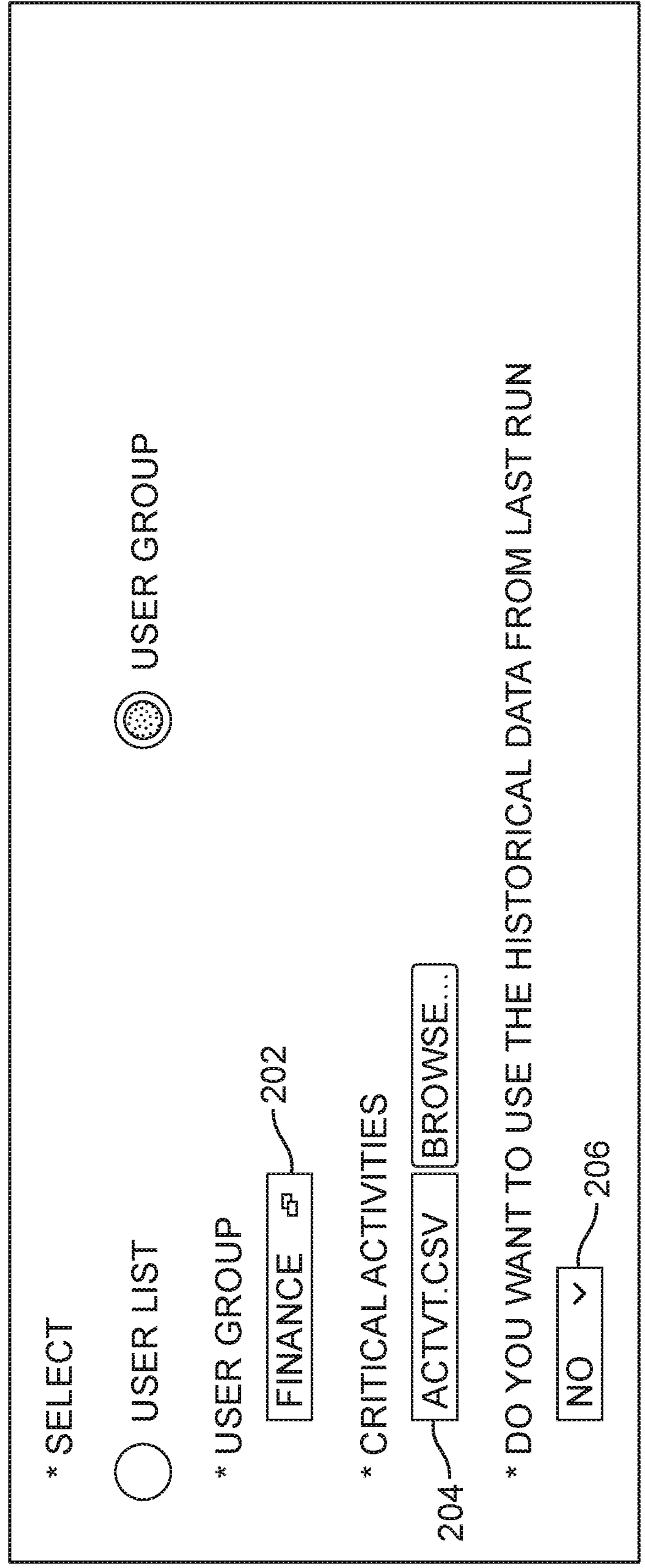
FIG. 2 shows a schematic diagram of an input display through which a human expert can select inputs used to extract information from tables stored in a relational database according to an embodiment.

FIG. 2 shows an input display 200 through which a human expert can select inputs used to extract information from tables stored in a relational database according to an embodiment. The human expert can select between a user list or a user group. In FIG. 2, because user group is selected, a box 202 for selecting a user group is displayed. In FIG. 2, "FINANCE" has been selected as the user group. A configuration file called "ACTVT.CSV", which includes values for critical activities the human expert is interested in analyzing, is selected in box 204 for uploading as input. In FIG. 2, "NO" is selected in a box 206 for selecting whether or not to use the historical data from the last run in the present run. The output in response to the input described with respect to the embodiment shown in FIG. 2 is discussed in detail with respect to FIG. 4 below. First, the tables used to generate the output are discussed with respect to FIG. 3.

Figure 3:
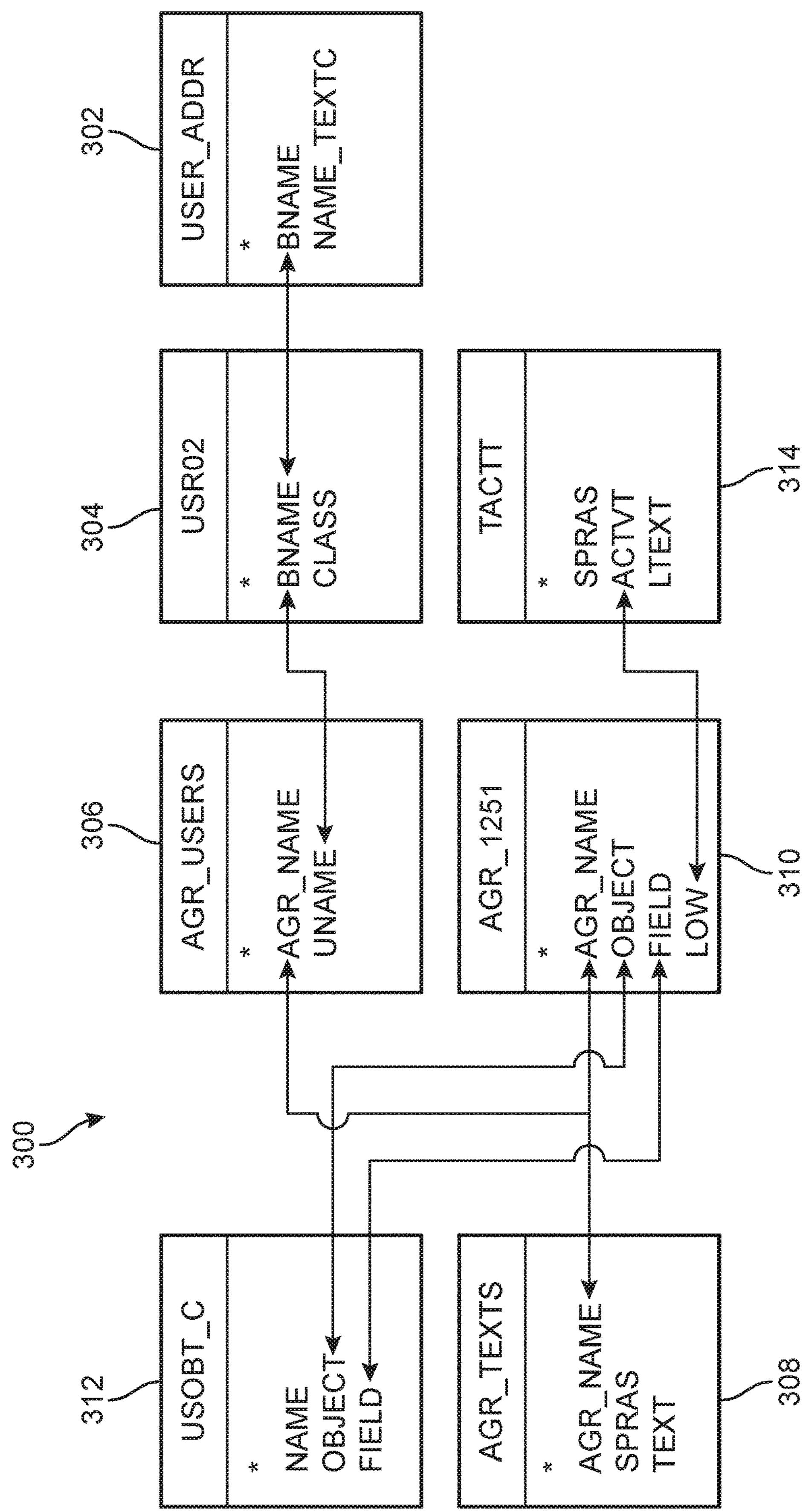
FIG. 3 shows a schematic diagram of a plurality of tables stored in a relational database according to an embodiment.

FIG. 3 shows a plurality of tables 300 stored in a relational database according to an embodiment. The tables shown in FIG. 3 include a first table 302, a second table 304, a third table 306, a fourth table 308, a fifth table 310, a sixth table 312, and a seventh table 314. In this example, the first table is called "USER_ADDR", the second table is called "USR02", the third table is called "AGR_USERS", the fourth table is called "AGR_TEXTS", the fifth table is called "AGR_1251", the sixth table is called "USOBT_C", and the seventh table is called "TACTT." FIG. 3 includes arrows that show commonalities between tables, as discussed in more detail below.

Below, Table 1 shows field values extracted from the tables discussed above with respect to FIG. 2, as well as these field value's corresponding field descriptions. These field values are used to either analyze the security access of one or more users or to find other field values that are to be analyzed. The tables in the exemplary embodiment of FIG. 1 are standard tables stored in a relational database provided by Systems, Applications & Products (SAP). Accordingly, Table 1 shows field values found in such standard tables. It is understood that the disclosed system and method may be applied to tables stored in a relational database provided by other providers. Accordingly, other tables may have other fields descriptive of user's properties, e.g., identities, group membership, roles, and security access authority, etc.

TABLE 1

Field Names and Descriptions

| FIELD NAME | FIELD DESCRIPTION |
|---|---|
| NAME | TCODE NAME |
| OBJECT | ROLE OBJECT |
| FIELD | FIELD NAME |
| AGR_NAME | ROLE NAME |
| SPRAS | LANGUAGE |
| TEXT | ROLE DESCRIPTION |
| UNAME | USER NAME |
| LOW | FIELD VALUE |
| BNAME | USER NAME |
| CLASS | USER GROUP |
| ACTVT | ACTIVITY VALUE |
| LTEXT | ACTIVITY DESCRIPTION |
| NAME_TEXTC | USER FULL NAME |

Extracting the field values used to analyze the security access of one or more users may begin by obtaining input for finding field values. For example, the input may include one or more of a user identification, user list, user group, configuration file, and historical data. In the embodiment in FIG. 3, the input includes user identification in the form of a user name. This user name is the same as the field value for the "UNAME" field and the "BNAME" field.

In some embodiments, the input may be used to find a first field value of a first field in a first table stored in a relational database, wherein the first table contains one or more of the inputs. For example, in the embodiment of FIG. 3, the field values of the "UNAME" or "BNAME" fields are used to find certain field values in the first table, second table, and third table, which each contain field values for at least one of the "UNAME" or "BNAME" fields. More specifically, the field values for "UNAME" or "BNAME" are used to find the field value for the "NAME_TEXTC" field in the first table, the field value for the "CLASS" field in the second table, and the field value for the "AGR_NAME" field in the third table.

In some embodiments, the first field value may be used to find a second field value of a second field in a second table stored in the relational database, wherein the second table contains at least the first field value. The field value for the "AGR_NAME" field is used to find the field value for the "AGR_NAME" field, the field value for the "SPRAS" field, and the field value for the "TEXT" field in the fourth table. The field value for "AGR_NAME" is used to find the field value for the "OBJECT" field, the field value for the "FIELD" field, and the field value for the "LOW" field in the fifth table. The field value for the "OBJECT" field and/or the field value for the "FIELD" field are used to find the field value for the "NAME" field in the sixth table. The field value for the "LOW" field, which is equivalent to the field value for the "ACTVT" field, is used to find the field value for the "SPRAS" field and the field value for the "LTEXT" field in the seventh value.

As can be seen in the example of FIG. 3, some of the tables and field values are queried just to find another field value. For example, the field value for the "AGR_NAME" field is used to find other field values that may be analyzed to determine the validity of a user's security access authority. However, the field value for the "AGR_NAME" field itself may not be analyzed to determine the validity of a user's security access authority.

Figure 4:
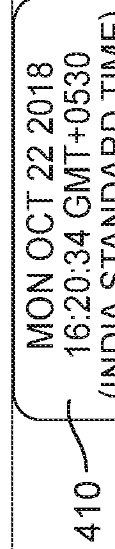
FIG. 4 shows a schematic diagram of a user group display according to an embodiment.

FIG. 4 shows a user group display 400 according to an embodiment. In this display, a list of users having critical access is shown. A time stamp 410 shows the time the information in the display was last updated. In this view of the display, "FINANCE" has been clicked on. As a result, the detailed report for the number of users having approved and revoked access, as well as the number of records to be analyzed, is displayed in the section called "SUMMARY OF ACTIONED RECORDS FOR FINANCE."

FIG. 5 shows a user access status display 500 according to an embodiment. In this display, the number "1" underneath "USERS WITH CRITICAL ACCESS" column in FIG. 4 has been clicked on. This "1" in FIG. 4 indicates that 1 user in the user group called "FIN" has critical access. FIG. 5 shows the 1 user with critical access in FIN group. This user, having the user name "RKAMBLE" is displayed in FIG. 4 with the particular critical activities that the user has the authority to perform in each row. The type of access the user has is listed in the "ACCESS" column. For example, in the first two rows the user has the authority to change and in the last two rows, the user has the authority to delete. Under the "ACTION" column, each row has a pull down menu in which a human expert can select between "APPROVE" and "REVOKE." The bot's recommendation to "APPROVE" or "REVOKE" appears in the pull down menu, and the human expert can either select the recommendation or the other option. The selection is listed in the "COMMENTS" column. The human expert may describe the reason for revoking or approving in the "COMMENTS" column. For example, as shown in the second row, "test revoke" is written to explain that the revocation was just a test. The "TIME STAMP" column gives a time stamp of when a user's access was approved or revoked. In addition to making changes or deleting particular items (e.g., invoice, order, payment, etc.), another type of access a user may have the authority for is adding and/or creating an item. The pulldown menus in the last two rows of the "ACTION" column are blank because a discussion is pending.

Figure 6:
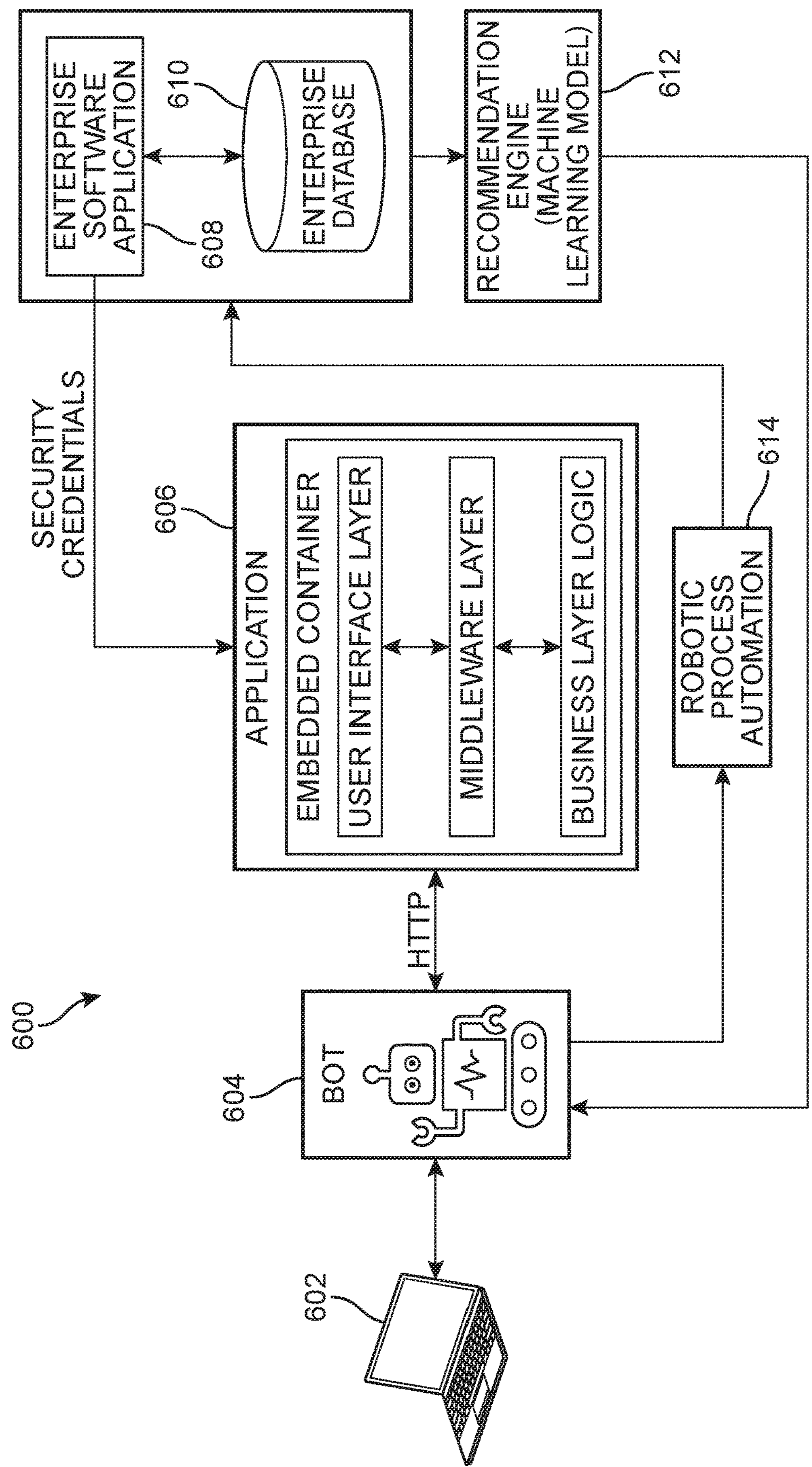
FIG. 6 shows a schematic diagram of a security architecture of a system for controlling security access according to an embodiment.

FIG. 6 shows a security architecture for a system for controlling security access 600 (or architecture 600) according to an embodiment. Architecture 600 includes a client device 602 that can be used by a human expert. The client device may be may be a smart phone, a laptop computer, a desktop computer, or another type of computing device. A human expert can launch an application 606 at a client layer. Output may be displayed in this client layer.

Architecture 600 further includes a trained bot trained using a machine learning algorithm 604 (or trained bot 604). As discussed with respect to the method, the trained bot may be trained using a machine learning algorithm to use the one or more of a user identification, user list, user group, configuration file, and historical data to find a first field value of a first field in a first table stored in a relational database, wherein the first table contains one or more of the user identification, user list, user group, configuration file, and historical data. The trained bot may also be trained using a machine learning algorithm to use the first field value to find a second field value of a second field in a second table stored in the relational database, wherein the second table contains at least the first field value.

Architecture 600 includes application 606, an enterprise application 608, an enterprise database 610, a recommendation engine 612, and a robotic process automation (RPA) 614.

Application 606 has an embedded container including a user interface layer (e.g., SAP U15), a middleware layer, and a business layer logic. Application 606 is where all logic may be written. In some embodiments, the user interface layer may include code obfuscation performed from a security perspective. Regarding the business logic layer and representational state transfer (REST) services, in some embodiments, a class file with hidden code may be shared. In some embodiments, no code resides in client device 602. In some embodiments, HTTP may be used to connect client device 602 with application 606. Application 606 may connect to enterprise software application 608 via standard function module READ RFC TABLE.

Enterprise software application 608 may receive a request from application 606 and may provide the required data from enterprise database 610 based on input.

Figure 7:
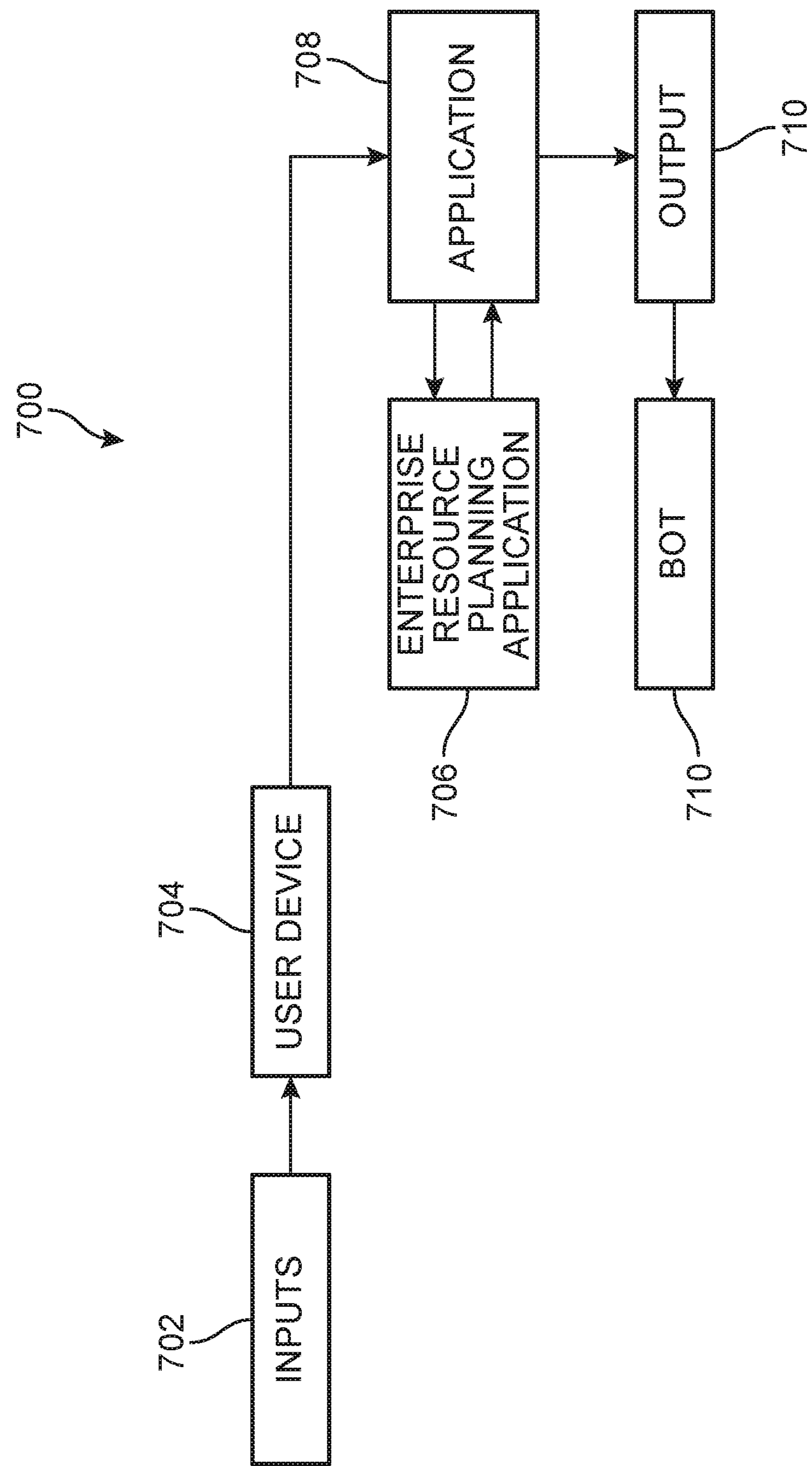
FIG. 7 shows a schematic diagram of landscape of a system for controlling security access according to an embodiment.

FIG. 7 shows a schematic diagram of a landscape 700 of a system for controlling security access according to an embodiment. Landscape 700 includes inputs 702, a client device 704, an application 708, an enterprise resource planning application 706, an output 710, and a bot 710. Inputs 702 may be the same or similar to the inputs discussed with respect to FIG. 2. Client device 704 may be the same or similar to client device 602 discussed with respect to FIG. 6.

Figure 8:
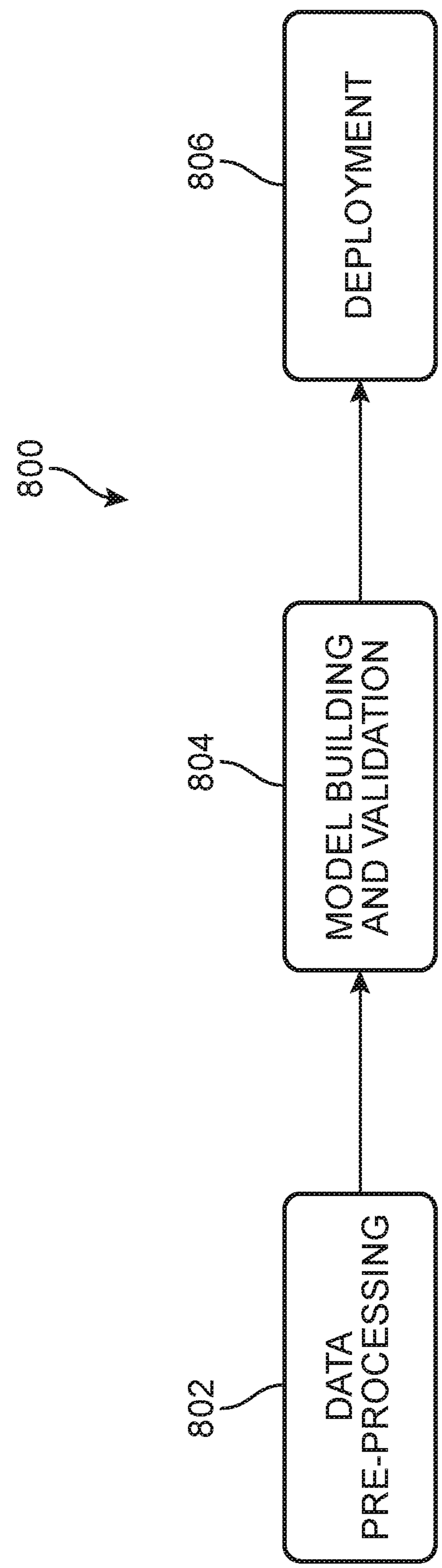
FIG. 8 shows a schematic diagram of method of training a machine learning model according to an embodiment.

FIG. 8 shows a schematic diagram of a method of training a machine learning model 800 according to an embodiment. Method 800 includes data preprocessing 802, model building and validation 804, and deployment 806. Preprocessing may include data wrangling and data cleansing. Data wrangling is the process of transforming and mapping data from one "raw" data form into another format with the intent of making it more appropriate for analytics. Since data may be gathered from different sources/clients, the data formats may be different. Data wrangling helps with making the data from different sources usable. Data cleansing is the process of detecting and correcting inaccurate records from a record set, table, or database and refers to identifying incomplete, incorrect, inaccurate or irrelevant parts of the data and then replacing, modifying, or deleting the coarse data.

In some embodiments, feature engineering may be performed to determine features for analysis during model building. In machine learning and statistics, feature selection, also known as variable selection, is the process of selecting a subset of relevant features (variables, predictors) for use in model construction. Feature extraction is for creating a new, smaller set of features that still captures most of the useful information. Dimension reduction or feature reduction may be used to reduce an initial d-dimensional feature space to a k-dimensional feature subspace (where $k<d$). Examples of methods for dimension reduction or feature reduction include: principal component analysis and linear discriminant analysis (LDA). It is understood that, in some embodiments, other methods of feature engineering may be employed for model building.

Model building and validation may include dividing data into three sets (train, validation, and test data) for statistical modeling. FIG. 9 shows a schematic diagram of a data set 900 according to an embodiment. Machine learning may be applied on training data and the hyperparameters of the model may be tuned based on validation data to avoid overfitting. Once the model provides good enough performance on the training and validation data, its performance may be checked against unseen test data. If the performance is sufficient, the model may be deployed. Below is an example of steps performed during model building and validation according to an embodiment:

Step 1: Divide the data randomly with replacement into n sets.

Step 2: Construct a decision tree for each set. Every decision tree can predict the action to be taken Step 3: Perform majority voting to predict the action taken for the overall set. Build a Random forest Model for the data set.

Step 4: Use R programming language to build the random forest model.

In one embodiment, the hyper-parameters used in a random forest model are as follows:

Type of random forest: classification

Number of trees: 500

No. of variables tried at each split: 2

In such an embodiment, the confusion matrix used in a random forest model may be as follows:

TABLE 2

| Confusion Matrix | | | |
|---|---|---|---|
| Prediction | Actual Approval | Actual Revocation | Class Error |
| Approve | 60 | 11 | 0.15492958 |
| Revoke | 3 | 58 | 0.04918033 |

Figure 10:
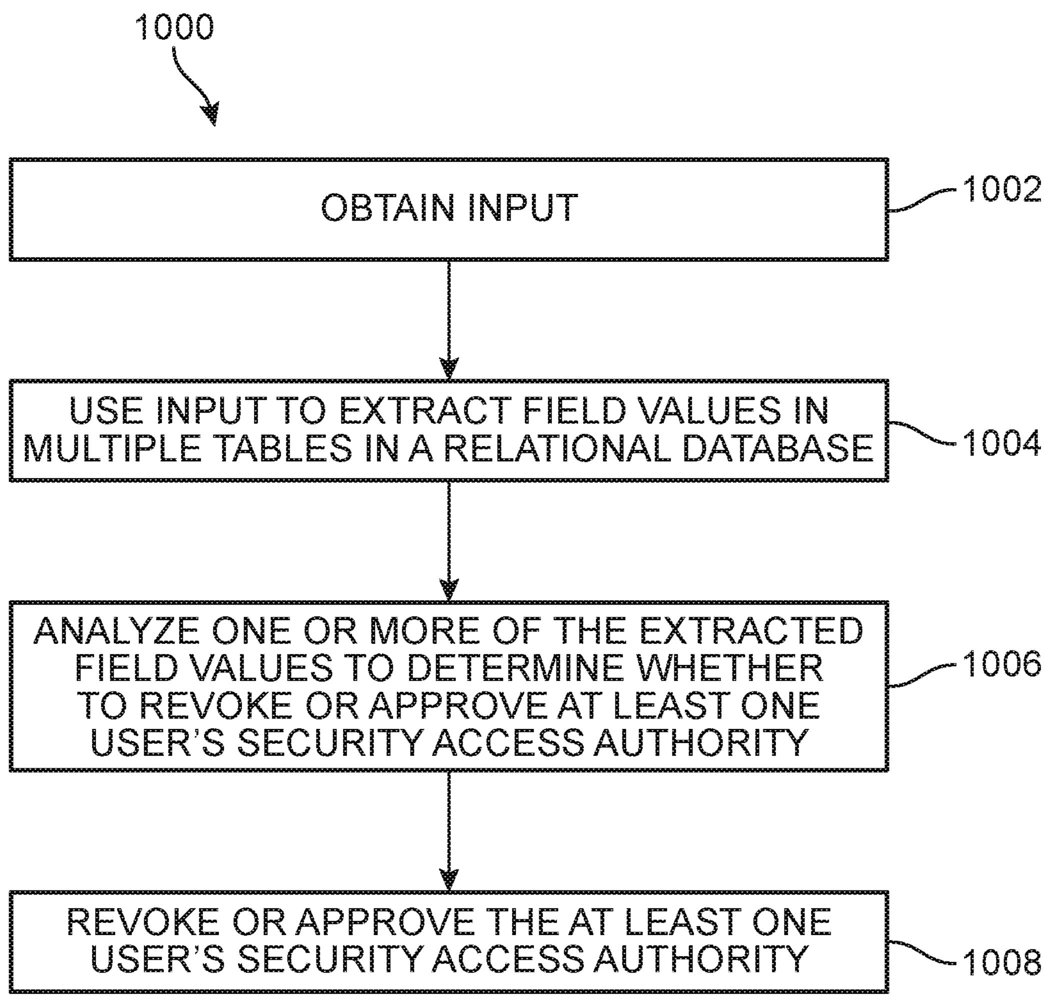
FIG. 10 shows a method of controlling security access 1000 (method 1000), according to an embodiment.

From the confusion matrix, the out-of-bag estimate of error rate is 10.61%. It is understood that machine learning can even use a human expert's real time and historical responses to decisions made by machine learning to update and improve the weighing process used in a machine learning algorithm in real time In some embodiments, rather than relying on a human expert to make the final decision as to whether a user's access authority should be revoked or approved, the revocation or approval may be automatically performed. For example, FIG. 10 shows a method of controlling security access 1000 (method 1000), according to an embodiment. Method 1000 includes obtaining input (operation 1002) and using the input to extract field values in multiple tables stored in a relational database (operation 1004). As discussed above with respect to method 100, in some embodiments, the input may include one or more of a user identification, user list, user group, configuration file, and historical data. For example, in some embodiments, a configuration file and either a user list or user group is used to extract field values in multiple tables stored in a relational database.

Method 1000 further includes analyzing one or more of the extracted field values to determine whether to revoke or approve at least one user's security access authority (operation 1006). In some embodiments, a trained bot that is trained using a machine learning algorithm may be used to analyze one or more of the extracted field values to determine whether to revoke or approve at least one user's security access authority. In some embodiments, the bot performs all of the disclosed method of controlling security access. Method 1000 includes automatically revoking or approving the at least one user's security access authority based on the decision made during operation 1006. In other words, the bot can use machine learning to automatically make a decision as to whether to revoke or approve at least one user's security access authority and the bot can also automatically revoke or approve at least one user's security access authority based on that decision.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of controlling security access, comprising:

obtaining input including one or more of a user identification, user list, user group, configuration file, and historical data;

using a trained bot that is trained using a machine learning algorithm to use the one or more of a user identification, user list, user group, configuration file, and historical data to find a first field value of a first field in a first table stored in a relational database, wherein the first table contains one or more of the user identification, user list, user group, configuration file, and historical data;

using the trained bot to use the first field value to find a second field value of a second field in a second table stored in the relational database, wherein the second table contains at least the first field value; and using the trained bot to use one or more of the user identification, user list, user group, configuration file, historical data, first field, second field, and a third field to generate a recommendation to revoke or approve at least one user's security access authority.

2. The computer implemented method of claim 1, further comprising revoking or approving the at least one user's security access authority in response to a human expert accepting the recommendation.

3. The computer implemented method of claim 1, further comprising displaying the history of a human expert declining the recommendation.

4. The computer implemented method of claim 1, further comprising using the trained bot to use the second field value to find the third field value of a third field in a third table stored in the relational database, wherein the third table contains at least the second field value, wherein the third field value is related to at least one user's security access authority to perform a first transaction.

5. The computer implemented method of claim 4, wherein using the trained bot to use one or more of the user identification, user list, user group, configuration file, historical data, first field, second field, and third field to generate a recommendation to revoke or approve at least one user's security access authority includes analyzing one or more of user identification, user list, user group, configuration file, historical data, first field, second field, and the third field.

6. The computer implemented method of claim 1, wherein the trained bot is trained using a sequence of steps including at least one of decision trees and random forest.

7. The computer implemented method of claim 1, wherein the trained bot is trained using a data set including at least one of a value for an access field and a transaction code field.

8. The computer implemented method of claim 7, further comprising analyzing at least one of the access field and the transaction code field to generate a recommendation to revoke or approve at least one user's security access authority.

9. A non-transitory computer-readable medium storing software comprising instructions executable by one or more computers which, upon such execution, cause the one or more computers to:

obtain input including one or more of a user identification, user list, user group, configuration file, and historical data;

use a trained bot that is trained using a machine learning algorithm to use the one or more of a user identification, user list, user group, configuration file, and historical data to find a first field value of a first field in a first table stored in a relational database, wherein the first table contains one or more of the user identification, user list, user group, configuration file, and historical data;

use the trained bot to use the first field value to find a second field value of a second field in a second table stored in the relational database, wherein the second table contains at least the first field value; and use the trained bot to use one or more of the user identification, user list, user group, configuration file, historical data, first field, second field, and a third field to generate a recommendation to revoke or approve at least one user's security access authority.

10. The non-transitory computer-readable medium storing software of claim 9, wherein the instructions further cause the one or more computers to revoke or approve the at least one user's security access authority in response to a human expert accepting the recommendation.

11. The non-transitory computer-readable medium storing software of claim 9, wherein the instructions further cause the one or more computers to display the history of a human expert declining the recommendation.

12. The non-transitory computer-readable medium storing software of claim 9, wherein the instructions further cause the one or more computers to use the trained bot to use the second field value to find the third field value of a third field in a third table stored in the relational database, wherein the third table contains at least the second field value, wherein the third field value is related to at least one user's security access authority to perform a first transaction.

13. The non-transitory computer-readable medium storing software of claim 9, wherein using the trained bot to use one or more of the user identification, user list, user group, configuration file, historical data, first field, second field, and third field to generate a recommendation to revoke or approve at least one user's security access authority includes analyzing one or more of user identification, user list, user group, configuration file, historical data, first field, second field, and the third field.

14. The non-transitory computer-readable medium storing software of claim 9, wherein the trained bot is trained using a sequence of steps including at least one of decision trees and random forest.

15. A system for controlling security access, comprising:
- one or more computers and one or more storage devices storing instructions that are operable, when executed by the one or more computers, to cause the one or more computers to:
  - obtain input including one or more of a user identification, user list, user group, configuration file, and historical data;
  - use a trained bot that is trained using a machine learning algorithm to use the one or more of a user identification, user list, user group, configuration file, and historical data to find a first field value of a first field in a first table stored in a relational database, wherein the first table contains one or more of the user identification, user list, user group, configuration file, and historical data;
  - use the trained bot to use the first field value to find a second field value of a second field in a second table stored in the relational database, wherein the second table contains at least the first field value; and
  - use the trained bot to use one or more of the user identification, user list, user group, configuration file, historical data, first field, second field, and a third field to generate a recommendation to revoke or approve at least one user's security access authority.

16. The system of claim 15, wherein the instructions further cause the one or more computers to revoke or approve the at least one user's security access authority in response to a human expert accepting the recommendation.

17. The system of claim 15, wherein the instructions further cause the one or more computers to display the history of a human expert declining the recommendation.

18. The system of claim 15, wherein the instructions further cause the one or more computers to use the trained bot to use the second field value to find the third field value of a third field in a third table stored in the relational database, wherein the third table contains at least the second field value, wherein the third field value is related to at least one user's security access authority to perform a first transaction.

19. The system of claim 15, wherein using the trained bot to use one or more of the user identification, user list, user group, configuration file, historical data, first field, second field, and third field to generate a recommendation to revoke or approve at least one user's security access authority includes analyzing one or more of user identification, user list, user group, configuration file, historical data, first field, second field, and the third field.

20. The system of claim 15, wherein the instructions further cause the one or more computers to analyze at least one of the access field and the transaction code field to generate a recommendation to revoke or approve at least one user's security access authority.

* * * * *